United States Patent [19]

Van Gestel

[11] Patent Number: 5,128,811
[45] Date of Patent: Jul. 7, 1992

[54] APPARATUS FOR REPRODUCING A BINARY DIGITAL SIGNAL, COMPRISING A READ HEAD HAVING A SPECIALLY SELECTED GAP LENGTH

[75] Inventor: Wilhelmus J. Van Gestel, Eindhoven, Netherlands

[73] Assignee: U.S. Philips Corporation, New York, N.Y.

[21] Appl. No.: 271,139

[22] Filed: Nov. 14, 1988

[30] Foreign Application Priority Data

Nov. 20, 1987 [NL] Netherlands .......................... 8702779

[51] Int. Cl.$^5$ .............................. G11B 5/09; G11B 5/25
[52] U.S. Cl. ........................................ 360/46; 360/119
[58] Field of Search ................... 360/119, 46, 65, 67

[56] References Cited

U.S. PATENT DOCUMENTS

| | | | |
|---|---|---|---|
| 2,536,810 | 1/1951 | Holmes et al. | 360/119 |
| 3,049,698 | 8/1962 | Thompson et al. | 360/119 |
| 4,642,718 | 2/1987 | Wachenschwanz | 360/119 |
| 4,755,891 | 7/1988 | Katoh et al. | 360/119 |

*Primary Examiner*—Vincent P. Canney
*Attorney, Agent, or Firm*—Leroy Eason

[57] ABSTRACT

An apparatus for reproducing a binary digital signal from a track on a magnetic record carrier (1) has a read head (2) with a gap having a gap length (g) which complies with $1.5b \leq g \leq 2.2b$, but which preferably complies with $g=2b$, b being the bit length of the bits in the digital signal recorded in the record carrier (1). If the read head is followed by a filter device (12) having the characteristic of a Nyquist-1 filter (N1), the overall response of the read head and the filter device will be substantially the same as the response of a class-4 partial-response system (PRF).

6 Claims, 1 Drawing Sheet

APPARATUS FOR REPRODUCING A BINARY DIGITAL SIGNAL, COMPRISING A READ HEAD HAVING A SPECIALLY SELECTED GAP LENGTH

BACKGROUND OF THE INVENTION

The invention relates to an apparatus for reproducing a binary digital signal from a track on a magnetic record carrier, comprising a read head for reading the digital signal from the track, which head has a signal output coupled to an input of a filter device, which device has an output coupled to an output terminal for supplying the digital signal, the overall response function of the read head and the filter device substantially corresponding to the response of a class-4 partial-response system, and the invention also relates to a read head intended for use in the apparatus.

An apparatus of the type defined in the opening paragraph is known from the publication "High data rate magnetic recording in a single channel" by C. H. Coleman et al, Journal of the IERE, Vol. 55, No. 55, No. 6, pp. 229-236, Jun. 1985.

Such a reproducing system, which is also referred to as a partial-response reproducing system, comprises an equalizer. This equalizer provides a correction for losses in the transmission channel. Transmission-channel losses are to be understood to mean write losses (losses occurring when the information is recorded in the magnetic record carrier) and read losses (the losses occurring when the information is read from the record carrier). The read losses may be classified as spacing losses (as a result of the spacing between the read head and the record carrier), tape-thickness losses, and gap length losses, for which reference is made to "The complete handbook of magnetic recording" by F. Jörgensen, p. 81. Since the frequency response characteristic for the gap length losses (which characteristic exhibits a sin x/x behavior) exhibits a spectral null at a wavelength equal to the gap length g, this means that the gap length of the read head in the known reproducing system is selected to be smaller than or equal to the bit length b of the bits in the digital signal recorded in the record carrier. This is because there are two bits per wavelength.

In the known reproducing system the filter device comprises two sections arranged in series. The first section is in fact that part of the equalizer which compensates for the gap losses of the read head. The second section is a Nyquist-2 filter or a class 4 partial-response filter. The response of the read head and the first section is equal to a constant (say 1). This means that the overall response of the read head and the filter device is in fact dictated by and is identical to the response of the second section.

The known reproducing system has the advantage that the level of the noise component in the digital signal being reproduced is low. A disadvantage is that intersymbol interference occurs during reading. This is only a minor disadvantage because it concerns controlled intersymbol interference for which a correction is possible. another reproducing system is known in which a Nyquist-1 filter is arranged after the read head, see for example the book "Digital and analog communication systems" by K. Sam Shanmugam, John Wiley 1979, in particular Chapter 5, pp. 189-203. In said system intersymbol interference does not pose a problem at the clock instants. However, as the bandwidth of a Nyquist-1 filter is larger than that of a partial-response system the amount of noise in the signal being read is larger than in the first prior-art reproducing system described herein.

An important parameter in recording and reproducing systems for digital signals is the information density on the record carrier. The information density on the record carrier should preferably be as high as possible, which means that the bit length of the signal recorded on the record carrier is sought to be made as small as possible. For example, it is envisaged that in the future bit lengths smaller than 0.25 μm will have to be realized.

Write and read heads having a gap length (i.e. the length of the gap viewed in the longitudinal direction of the track) of 0.25 μm or less are difficult to manufacture. Moreover, recording digital information in the record carrier by means of a write head having such a small gap length is very difficult as a result of head saturation. In addition, the efficiency losses during reading increase as the gap length decreases, for this refer to the afore-mentioned handbook by Jörgensen, pp. 86-94.

SUMMARY OF THE INVENTION

It is an object of the invention to provide steps enabling digital information recorded on the record carrier with a high density to be reproduced correctly.

To this end the apparatus in accordance with the invention is characterized in that the read head has a gap having a gap length g which complies with $1.5\,b \leq g \leq 2.2\,b$, b being the bit length of the bits in the digital signal recorded in the magnetic record carrier, and in that the filter device has a filter characteristic which substantially corresponds to the filter characteristic of a Nyquist-1 filter. Preferably, the gap length is substantially equal to twice the bit length.

The invention is based on the recognition of the following fact. In the apparatus of the type defined in the opening paragraph the response of the class-4 partial-response system is in fact determined by the filter device which follows the read head. As already stated hereinbefore, this filter device comprises that part of the equalizer which compensates for the gap losses of the read head and it comprises a Nyquist-2 partial-response filter. The overall response of the head and the filter device is then identical to the response of the partial-response filter.

If, in accordance with the invention the read head has a gap length between 1.5 b and 2.2 b, preferably 2 b, and if this read head is followed by a Nyquist-1 filter the overall response will yet be a class-4 partial-response. The filter device then no longer compensates for the gap losses. The gap losses are now used effectively to realize the partial-response characteristic. Consequently, this also means that the equalizer to be used in the apparatus in accordance with the invention provides only compensation for the write losses, the distance losses, and the tape-thickness losses.

The apparatus in accordance with the invention, just like in the first prior-art apparatus described in the foregoing, exhibits controlled intersymbol interference. The apparatus in accordance with the invention is, moreover afflicted with slightly more noise. This is because the Nyquist-1 filter has a larger bandwidth than the filter device in the known apparatus. However, a write head having a gap length equal to twice the bit length provides a substantial improvement in writing performance because head saturation is less likely to occur, thus enabling higher densities to be achieved on the record. At the reproduction side such a head provides a higher read efficiency owing to the longer gap.

Since the response of the read head is now used effectively to realize the partial-response characteristic this could mean that in order to obtain a well-defined gap length more stringent requirements would have to be imposed on the manufacturing process for the fabrication of the read head. However, computations have demonstrated that a broad margin for the gap length is permissible within which the partial-response is preserved. This margin is defined by the limits of 1.5 b and 2.2 b within which the gap length may vary.

It is to be noted further that for writing information in a magnetic record carrier it is already known to give the write head a gap length larger than the bit length. However, until now such a step has not yet been proposed for read heads.

Writing a digital signal in a magnetic record carrier with a write head having a gap length g, which complies with $1.5 \leq g \leq 2.2$ b, is readily possible. This is to be understood to mean that this requires no additional compensation step.

BRIEF DESCRIPTION OF THE DRAWING

An embodiment of the invention will now be described in more detail, by way of example, with reference to the accompanying drawings. In the drawings FIG. shows an embodiment of an apparatus for reproducing a binary digital signal.

DETAILED DESCRIPTION OF THE INVENTION

Figure 1:
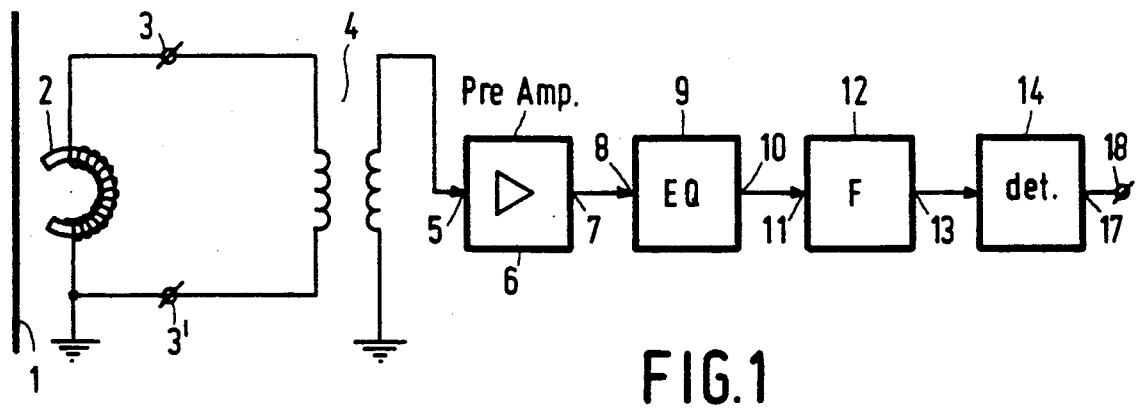

FIG. 1 shows diagrammatically an apparatus for reproducing a binary digital signal from a track on a record carrier 1. The apparatus comprises a read head 2 having a signal output 3-3' coupled to an input 5 of a pre-amplifier 6 via a rotary transformer 4 in the case that the apparatus operates in accordance with the helical-scan principle. The output 7 of this pre-amplifier 6 is coupled to an input 8 of an equilizer 9, which has an output 10 coupled to an input 11 of a filter device 12. The equalizer 9 serves to compensate for the write losses and to compensate for the spacing and tape-thickness losses, the latter two being read losses. This means that the equalizer does not compensate for the gap-length losses of the read head 2. The output 13 of this filter device 12 is coupled to a detector 14, which has an output 17 coupled to an output terminal 18 for supplying the digital signal.

Figure 2:
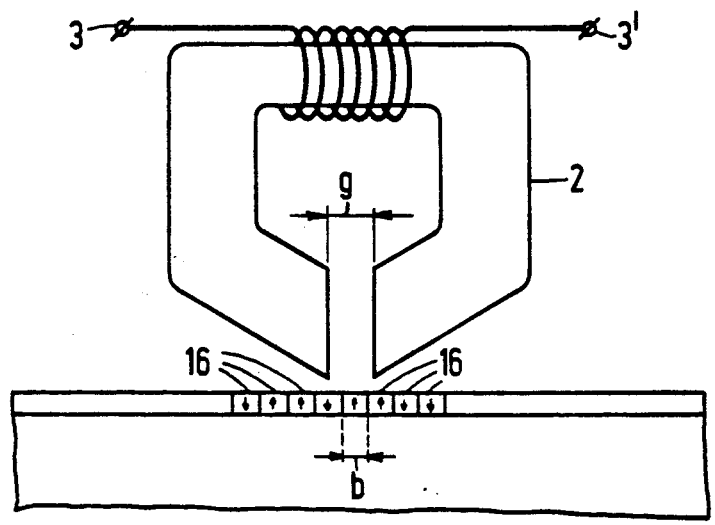
FIG. 2 illustrates how the read head co-operates with the magnetic record carrier.

FIG. 2 illustrates diagrammatically how the read head 2 co-operates with the magnetic record carrier 1. FIG. 2 is a cross-sectional view of the record carrier 1 exactly at the location of and in the longitudinal direction of a track 15 on the record carrier 1. In the track 15 a binary digital signal is recorded. Each bit has a bit length b and is characterized by an upwardly oriented or conversely, a downwardly oriented direction of magnetization, as is indicated by the arrows in the boxes 16 in FIG. 2. Thus, in the present case "vertical recording" is adopted, but this is not essential. Alternatively, the digital signal may be recorded in a track 15 by a "longitudinal recording" method.

The read head 2 has a gap length g which complies with: $1.5\,b \leq g \leq 2.2\,b$ and which is preferably equal to twice the bit length b. Hereinafter it is assumed that $g = 2b$.

Figure 3:
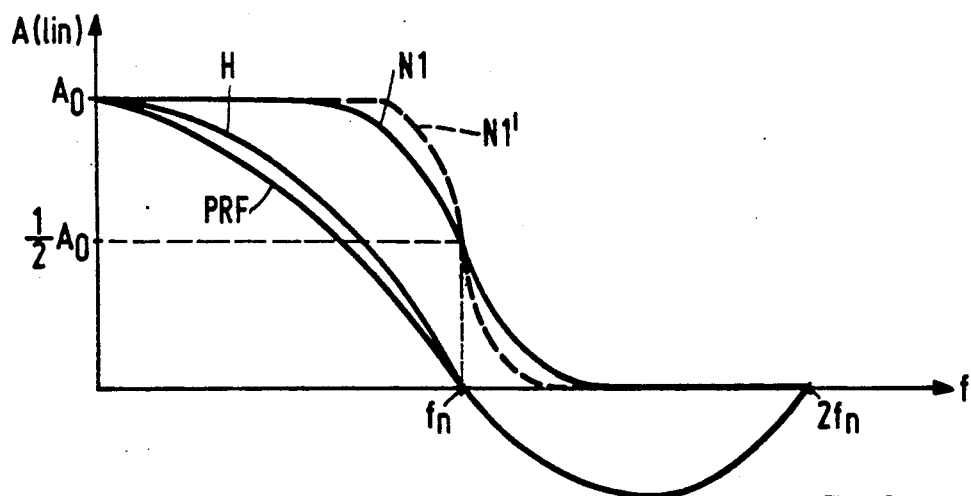
FIG. 3 shows a number of filter characteristics of elements in the apparatus shown in FIG. 1.

The filter device 12 has a filter characteristic in conformity with that of a Nyquist-1 filter. FIG. 3 shows two possibilities for such a filter characteristic, referred to as N1 and N1'. Only the amplitude as a function of the frequency is given. Nyquist-1 filters are known and have the following characteristics:

the filters exhibit a low-pass characteristic having a bandwidth of $f_n$, where $f_n = \frac{1}{2}b$ (b in seconds), for $f = f_n$ the characteristics has value $A_0/2$, where $A_0$ is the value of the characteristic for $f=0$.

Moreover, the curve H in FIG. 3 represents the frequency response of the gap length losses of the read head 2. This characteristic is defined by the function $\sin(\pi fg/v)/\pi fg/v$, where v is the tape velocity and g is the gap length. If the gap length is equal to $2\times$ the bit length it follows that $f_n = g/v$, the spectral null in the gap-length losses then appearing at the Nyquist frequency $f_n$. It is evident that the curve H exhibits spectral nulls for $f = f_n$ and $2f_n$ etc. Since the read head 2 and the filter device 12 are arranged in series the overall response of the read head 2 and the filter device 12 will be as illustrated by a curve PRF in FIG. 3, which also has a spectral null for $f = f_n$.

This curve PRF is the characteristic of a class-4 partial-response system. An extensive description of Nyquist-2 (partial-response) filters can be found in "Data transmission" by W. R. Bennett and J. R. Davey, Chapter 5, McGraw-Hill. The reproducing apparatus described therein supplies an output signal whose noise component is of the same magnitude as in the case that the digital signal is read with a read head having a gap length equal to the bit length and followed by a Nyquist-1 filter. However, the invention has the advantage that by means of a head having a gap length equal to twice the bit length the digital signal can be recorded better, i.e., with higher densities, in the record carrier and can also be read by means of the reproducing apparatus described. On the other hand, the reproducing apparatus described suffers from intersymbol interference. The known reproducing apparatus having a read head with a gap length equal to the bit length followed by a Nyquist-1 filter does not exhibit such interference. This is because the overall response of the read head and the Nyquist-1 filter in the known apparatus resembles the response of the Nyquist-1 filter itself. This response covers a larger bandwidth than the curve PRF of the reproducing apparatus in accordance with the invention, see FIG. 3.

If the reproducing apparatus in accordance with the invention is compared with the known apparatus comprising a head having a gap length equal to the bit length and followed by a Nyquist-2 filter PRF, the reproducing apparatus in accordance with the invention is found to produce more noise and a larger signal, is also afflicted with intersymbol interference but enable signals with higher bit densities to be recorded on and reproduced from the record carrier.

It is to be noted that the invention is not limited to the embodiments described herein. The invention also applies to those apparatuses which differ from the embodiments disclosed in respects which are not relevant to the present invention.

What is claimed is:

1. An apparatus for reproducing a binary digital signal from a track on a magnetic record carrier, comprising a read head for reading the digital signal from the track, which head has a signal output coupled to an input of a filter device, which device has an output coupled to an output terminal for supplying the digital signal, the overall response of the read head and the filter device substantially corresponding to the response of a class-4 partial-response system, characterized in that the read head has a gap having a gap length g which complies with $1.5\,b \leq g \leq 2.2\,g$, b being the bit length of the bits in the digital signal recorded in the magnetic record carrier, and in that the filter device has a filter characteristic which substantially corresponds to the filter characteristic of a Nyquist-1 filter.

2. An apparatus as claimed in claim 1, characterized in that the gap length is substantially equal to twice the bit length.

3. In an apparatus for reproducing a binary digital signal from a track on a magnetic record carrier, the improvement comprising:

a read head for reading a digital signal from a magnetic record carrier and having a gap with a gap length g such that $1.5\,b \leq g \leq 2.2\,g$, wherein b is the bit length of bits of the digital signal recorded in the magnetic record carrier; and filtering means having a substantially Nyquist-1 filter characteristic for filtering the output of said read head, whereby the combination of said read head and said filtering means has substantially a class-4 partial-response.

4. In an apparatus for reproducing a binary digital signal according to claim 3, said read head having a gap with a gap length substantially equal to twice the bit length of bits recorded in the magnetic record carrier.

5. In an apparatus for reproducing a binary digital signal according to claim 4, equalizing means for correcting read and write losses.

6. In an apparatus for reproducing a binary digital signal according to claim 3, equalizing means for correcting read and write losses.

* * * * *